(No Model.)
J. B. WALKER.
WAGON BRAKE.
No. 381,865. Patented Apr. 24, 1888.
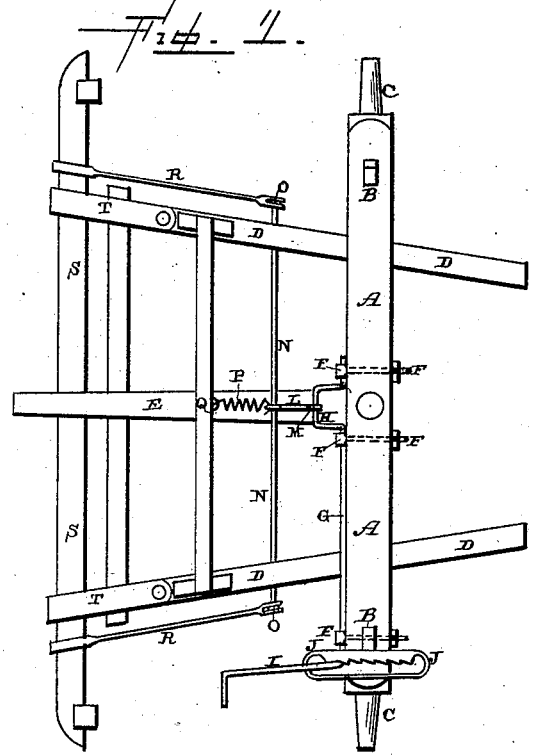
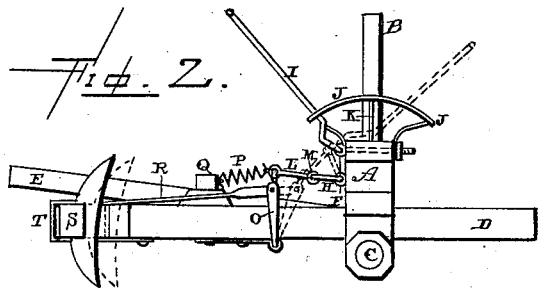
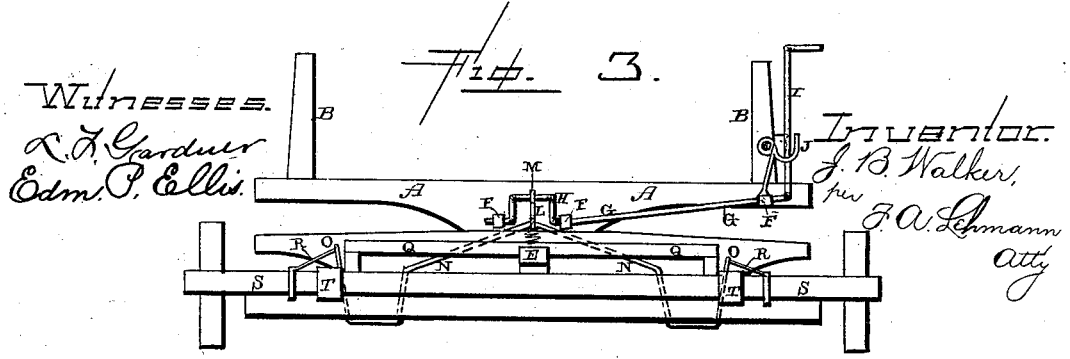

UNITED STATES PATENT OFFICE.

JOSEPH BOEN WALKER, OF TREZEVANT, TENNESSEE.

WAGON-BRAKE.

SPECIFICATION forming part of Letters Patent No. 381,865, dated April 24, 1888.

Application filed December 19, 1887. Serial No. 258,406. (No model.)

*To all whom it may concern:*

Be it known that I, JOSEPH BOEN WALKER, of Trezevant, in the county of Carroll and State of Tennessee, have invented certain new and useful Improvements in Wagon-Brakes; and I do hereby declare the following to be full, clear, and exact description of the invention, such as will enable others skilled in the art to which it pertains to make and use it, reference being had to the accompanying drawings, which form part of this specification.

My invention relates to an improvement in wagon-brakes; and it consists in the combination of the bolster having a suitable ratchet or catch for the lever connected to one end outside of the standard, the cranked shaft which is journaled upon the rear side of the bolster and to the outer end of which the operating-lever is secured, a connecting-rod, the crank-shaft which is journaled upon the hounds and is connected at its ends by suitable rods with the brake-beam which moves in suitable guides secured to the hounds, and a spring for moving the brakes out of contact with the wheel as soon as the operating-lever is freed, as will be more fully described hereinafter.

The object of my invention is to secure the catch for the operating-lever to one of the standards and to have the operating-lever extend up beside the box of the wagon, where it can be readily operated, and to connect to the operating cranked shaft a spring which will automatically throw the brakes from the wheel as soon as the lever is left free to move.

Figure 1 is a front view of a brake embodying my invention. Fig. 2 is a side elevation of the same. Fig. 3 is a rear view of the bolster and the parts connected thereto.

C represents the front axle, A the bolster, B the standard, D the hounds, and E the reach, all of which parts are constructed in the usual manner. Journaled upon the rear side of the bolster, by means of suitable eyebolts, F, which pass horizontally through it, is the shaft G, which is provided with the crank H at its inner end, and which has secured rigidly to its outer end the operating flexible brake-lever I, which extends upward slightly above the top of the wagon-bed and in close proximity to the standards, so as to be readily operated by the driver without the necessity of moving from his seat.

Secured both to the bolster and to the standard is the catch J, by means of which the lever is held in any desired position, and which has its two ends to project down and catch upon opposite sides of the bolster, and through which ends one of the clamping-eyebolts F is made to pass. By this construction this bolt F is made to serve both as one of the journals or bearings for the shaft and to secure the ends of the catch in position at the same time. Suitable flanges formed upon this catch J catch over opposite sides of the standard, and are rigidly secured thereto in any suitable manner. The outer edge or guard portion of the catch is supported by means of the vertical rod K, which extends upward from the end of the bolster, as shown. When the operating-lever is moved either forward or back, the shaft and its crank are correspondingly turned for the purpose of operating the brakes.

Connected to the crank H is a ring, M, and to this ring is loosely fastened a connecting-rod, L, which is connected at its rear end to the crank-shaft N, which is journaled upon the hounds and provided with a crank, O, at each of its ends. The ring M is used so that it can slide back and forth upon the crank H when the front axle is turned, so as to stand at an angle to the bolster. If no provision were made for a loose connection between the crank and connecting-rod, the front axle could not be turned at an angle to the bolster. When the axle is turned in one direction, the ring slides to one end of the crank, and when turned in the other the ring slides to the other end.

The shaft N is journaled at each of its cranked ends upon the under side of the hounds and is raised upward at its center, so as to pass over the top of the reach E. To the center of this shaft N is fastened a spiral spring, P, which has its rear end fastened to a cross-bar, Q, which extends from one hound to the other across the top of the reach. This spring serves to draw the central raised portion of the shaft N backward as soon as the operating-lever is released, and thus cause the cranks O to be forced backward through the connecting-rods R upon the brake-beam S, which is placed in suitable horizontal guides, T, secured to the rear end of the hounds. When the operating-lever is moved forward at its upper end, the crank H upon the shaft G draws the central portion of the shaft N forward, and thus causes the brakes to be applied to the wheels. The moment the operating-lever is released the shaft N is drawn backward at its center by means of the spring, and the brakes are thus thrown out of contact with the wheels.

Having thus described my invention, I claim—

1. The combination of the bolster and standard with the catch for the operating-lever, and which is secured both to the standard and the bolster, the cranked shaft journaled upon the bolster and provided with a crank at one end and an operating-lever at the other, a connecting-rod, the shaft N, provided with a crank at each of its ends, a spring for drawing the shaft N back to position after having been moved, the connecting-rod, and brake-beam guides, substantially as shown and described.

2. The combination of the bolster and the standard with the catch for the operating-lever, and the eyebolt F, which passes through the bolster and which serves both as a journal for one end of the shaft G and to secure the ends of the catch in position upon opposite sides of the bolster, substantially as set forth.

3. The combination of the bolster, the front axle upon which it is pivoted, the shaft G, provided with the crank at its inner end, the hounds, the shaft N, bent upward at its center, the connecting-rod, and the ring which unites the shaft N and the screw together, the ring being adapted to move back and forth upon the crank when the axle is turned at an angle to the bolster, substantially as specified.

In testimony whereof I affix my signature in presence of two witnesses.

JOSEPH BOEN WALKER.

Witnesses:
W. A. MARSHALL,
A. E. HILLSMAN.